United States Patent [19]

Nelson et al.

[11] Patent Number: 5,467,040

[45] Date of Patent: Nov. 14, 1995

[54] METHOD FOR ADJUSTING CLOCK SKEW

[75] Inventors: Stephen E. Nelson, Chippewa Falls; David L. Duxstad, Eau Claire; Galen C. Flunker, Menomonie, all of Wis.

[73] Assignee: Cray Research, Inc., Eagan, Minn.

[21] Appl. No.: 98,204

[22] Filed: Jul. 28, 1993

Related U.S. Application Data

[62] Division of Ser. No. 465,947, Jan. 16, 1990, Pat. No. 5,258,660.

[51] Int. Cl.$^6$ .............................. H03H 11/26; H03K 1/04
[52] U.S. Cl. ........................ 327/276; 327/277; 327/291; 327/292; 327/293; 327/294
[58] Field of Search .................................... 307/603, 606, 307/602, 605, 595, 597; 328/55, 63, 72; 371/1

[56] References Cited

U.S. PATENT DOCUMENTS

| | | | |
|---|---|---|---|
| 3,594,656 | 7/1971 | Tsukamoto | 331/49 |
| 3,820,030 | 6/1974 | Williams | 328/63 |
| 4,165,490 | 8/1979 | Howe, Jr. et al. | 328/60 |
| 4,504,749 | 3/1985 | Yoshida | 307/603 |
| 4,675,562 | 6/1987 | Herlein et al. | 307/602 |
| 4,675,612 | 6/1987 | Adams et al. | 328/63 |
| 4,713,621 | 12/1987 | Nakamura et al. | 328/55 |
| 4,714,924 | 12/1987 | Ketzler | 307/602 |
| 4,754,164 | 6/1988 | Flora et al. | 307/269 |
| 4,755,704 | 7/1988 | Flora | 307/269 |
| 4,805,195 | 2/1989 | Keegan | 328/63 |
| 4,839,604 | 6/1989 | Tanahashi | 328/62 |
| 4,855,616 | 8/1989 | Wang et al. | 307/269 |
| 4,864,160 | 9/1989 | Abdoo | 307/269 |

(List continued on next page.)

FOREIGN PATENT DOCUMENTS

WO87/04306  7/1987  WIPO.

OTHER PUBLICATIONS

International Test Conference 1988 Proceedings, Sep. 12, 1988, pp. 23–27, C. Branson et al.
International Test Conference 1988 Proceedings, Sep. 12, 1988, pp. 108–113, T. Tamama et al.
IEEE Design & Test of Computers, vol. 5, No. 5, Oct. 1988, IEEE, (New York), US), K. D. Wagner: "Clock System Design", pp. 9–27.
IEEE Journal of Solid–State Circuits, vol. 24, No. 5, Oct. 1989, IEEE, (New York, US), Tai–Ichi Otsuji et al: "A–10–PS Resolution, Process–Insensitive Timing Generator IC:", pp. 1412–1418.
IEEE Journal of Solid State Circuits, vol. SC–21, No. 2, Apr. 1986, IEEE, (New York, US), E. G. Friedman et al.: "Design and Analysis of a Hierachical Clock Distribution System for Synchronous Standard Cell/Macrocell VLSI" pp. 240–246.
International Search Report, Appln No. PCT/US 90/02775, Oct. 24, 1990.
1988 International Test Conference, Paper 22.3, pp. 411–420, 1988 IEEE, Teradyne, Inc., to John Arena: "Evaluating the Limitations of High–Speed Board Testers".

Primary Examiner—Timothy P. Callahan
Assistant Examiner—Trong Phan
Attorney, Agent, or Firm—Schwegman, Lundberg & Woessner

[57] ABSTRACT

A method of adjusting clock skew for a computer system, wherein the computer system includes a clock generator for generating a clock signal, at least one logic module and a clock distribution network for carrying the clock signal from the clock generator to the logic modules, includes deskewing each of the logic modules and also deskewing the distribution network between the clock generator and the logic modules. Deskewing is performed by measuring a delay for the clock signal between a clock input and a test point on the logic module, comparing the measured delay to a desired delay, calculating an amount of adjustment needed to cause the measure delay to equal a desired delay and programming a skew compensator on the logic module with a calculator to mount adjustment.

4 Claims, 8 Drawing Sheets

U.S. PATENT DOCUMENTS

| | | | |
|---|---|---|---|
| 4,868,514 | 9/1989 | Azevedo et al. | 307/603 |
| 4,922,141 | 5/1990 | Lofgren et al. | 307/595 |
| 4,999,526 | 3/1991 | Dudley | 307/269 |
| 5,043,596 | 8/1991 | Masuda et al. | 307/262 |
| 5,049,766 | 9/1991 | van Driest et al. | 307/603 |
| 5,087,829 | 2/1992 | Ishibashi et al. | 307/269 |
| 5,087,842 | 2/1992 | Pulsipher et al. | 307/603 |
| 5,175,452 | 12/1992 | Lupi et al. | 307/606 |
| 5,245,231 | 9/1993 | Kocis et al. | 307/606 |

METHOD FOR ADJUSTING CLOCK SKEW

This is a division of application Ser. No. 07/465,947, filed Jan. 16, 1990 now U.S. Pat. No. 5,258,860.

FIELD OF THE INVENTION

The present invention relates to an apparatus and method of compensating for skew (time difference) between electrical signals, and a system for generating and distributing skew-compensated signals. More particularly, the present invention relates to a skew compensation circuit capable of providing electronic adjustment in sub-nanosecond increments, methods of adjusting and initializing skew compensation circuits, a pulse generator using a skew compensation circuit to precisely adjust the width of the pulse, and a clock distribution system for providing skew compensated clock signals, suitable for use in a high speed computer system.

BACKGROUND OF THE INVENTION

In high speed supercomputers of the type produced by Cray Research, Inc., the Assignee of the present invention, a system clock signal is distributed throughout so as to control timing of events within the computer. Clock signals are typically distributed from a single distribution point to various destination points within the computer, which may be located some distance apart. For reasons which will be discussed later, the signals do not arrive at all destination points at exactly the same time. The difference in time between these arrivals is called skew. On slower computer systems, skew is usually a very small portion of the system clock period and is thus likely to be insignificant. However, on faster computers with faster system clocks, the same amount of skew may be a substantial portion of the clock period and may actually limit the speed at which the computer can operate. Additionally, in a physically larger computer system, the distances between destination points and the distribution point can vary dramatically, resulting in increased skew.

A typical path for a clock signal will include fanout gates, circuit board foil paths, integrated circuit (IC) interconnect metal, and wires. Each of these provides an opportunity for introducing undesired clock skew. The amount of time it takes a Signal to travel along a wire or foil path is called its electrical length, and it depends upon its physical length and its capacitance. All else being equal, a signal will take longer to travel a long path than a short one. If the physical lengths of all the clock signal paths are not equal, skew is introduced.

Clock signal paths will often include several levels of fanout gates and buffering. Skew results if there are unequal numbers of gates in the signal paths or if there are variations in how long it takes a signal to pass through various gates. How long it takes a signal to pass through a gate depends upon several factors, including the propagation delay characteristics of the particular type of gate, the number of loads the gate is driving, and the temperature of the gate. Any variation of these factors between two signal paths will cause skew in the signals. Even if these factors are identical, there may be variations between individual gates of the same type.

Crosstalk from adjacent signals can be another cause of clock skew. For example, if during a transition from one logic state to another, a signal's voltage level is altered by crosstalk, then the point in time when the signal is determined to have switched will be altered, thus introducing skew.

Another source of skew is when the logic level is determined by reference to a power supply voltage. For example, if the logic levels are defined as voltages relative to ground, any noise on a logic gate's ground reference will affect when the gate determines an input signal to have switched.

There are several reasons for attempting to eliminate as much skew as possible. First, it limits the speed at which a system can run. Within a computer, tasks are often performed serially, with data being passed from one stage of the computer to another on subsequent clock cycles. The time period of the clock must be long enough to account for the time it takes a stage to process the data and propagate it to the next stage. In addition, the clock period must also allow for any skew between the clock signals at the various stages. For example, if one stage is clocked late due to clock skew but the next stage is clocked on time, the data from the first stage may not yet be present when the second stage is clocked. The clock period thus must be stretched to accommodate not only the time needed for the first stage to process and propagate the data, but also for the amount of skew between the clock signals present at the two stages. The system clock can thus be sped up by the amount of any skew that can be eliminated.

Similarly, clock skew may prevent a system from being slowed down. It is often desirable to slow down a system clock for diagnostic purposes, but if slowed down too much, the system may no longer function. For example, if one stage is clocked on time but the next stage is clocked late due to clock skew, the data from the first stage may no longer be present when the second stage is clocked.

Supercomputers are designed modularly, with circuitry placed on various removable circuit boards or modules. The presence of clock skew in the system may reduce the ability of a board or module to be interchanged from one machine to another. Since the amount of time it takes a signal to propagate through a particular type of logic gate varies from gate to gate, the amount of clock skew seen on a particular module may be different from that seen on other modules. A system designed to accommodate skew present on typical modules may not work with all modules, especially those where the amount of skew differs substantially from that of the typical module. The result is that some modules may not function in all machines.

There are several techniques used to attempt to reduce clock skew. The designer can attempt to equalize the wire and foil trace lengths between the clock source and all destinations. This is often accomplished by distributing the clock signals radially from a distribution point physically located near the center of the machine. The designer can also equalize the number of gates and types of gates in all clock signal paths. Clock skew can also be reduced by equalizing the amount of load that gates and various signal paths must drive. Since these techniques affect the fundamental architecture of the system, they can only be performed during the design of the system.

There are also delay introduction techniques that can be performed during the manufacture or installation of the system. What is important is the difference in delay between the various signal paths, not the actual amount of delay in any given path. Thus, skew between signals can be compensated for by introducing a specific amount of delay in the faster signal paths so as to match the electrical length of the slowest signal path. One example of such a technique is delay line tuning, as disclosed in U.S. Pat. No. 4,165,490. Delay line tuning involves connecting a clock signal path through a delay line which provides multiple outputs, each corresponding to a different delay amount. The output corresponding to the needed delay is selected at the time of installation by reference to other clock signal paths.

Another example of a delay introduction technique is foil path select tuning. With this technique, several alternate foil paths are provided on a circuit board, each tuned to a different electrical length and thus a different delay. The foil path corresponding to the delay needed to skew compensate the signal is selected by applying either a solder bridge or wire so as to connect the foil into the signal path.

The effectiveness and practicality of these methods varies. Equalizing trace lengths, numbers of gates, and loading must be done during the initial design phase, and thus cannot account for design changes or component variations. Equalizing the number of gates in the path and the gate loading may not be possible..in all circumstances due to other design constraints of the circuit. Additionally,a previously equalized circuit may require the addition of new circuitry not conceived of during the initial design phase. Previously equalized paths may no longer be equalized after the addition of new circuitry.

Delay line tuning is adjustable, and so it can skew compensate a circuit even after the addition of new circuitry. However, delay lines typically have resolution in the nanosecond range. For high speed supercomputers, much more precision than this is necessary.

Foil path select tuning provides the sub-nanosecond resolution required, however, the tuning procedure involves soldering, tab welding, or some other method of making the required electrical and mechanical connection. These techniques are not easily automatable, and repeated adjustment risks damaging the circuit board due to the handling required or by the lifting of foils during the operation. In addition, foil path select tuning cannot be implemented in a single IC package due to the need to make a mechanical connection.

It is clear that there has existed a long and unfilled need in the prior art for a clock de-skewing technique capable of reducing skew to the sub-nanosecond range. The present invention solves these and other shortcomings of the techniques known in the prior art.

SUMMARY OF THE INVENTION

Accordingly, it is an object of the present invention to provide means and a method for precisely adjusting signal delay, and specifically for adjusting the delay of a clock signal so as to reduce clock skew below that achievable using prior methods. Another object of the present invention is to provide electronically programmable means for adjusting skew which can be self-contained within a single IC package.

In order to achieve the foregoing objects, an apparatus is disclosed for adjusting signal delay, comprising an input for receiving a signal to be delay adjusted; delay elements including capacitive delay elements for providing multiple signal paths of various delays; delay selection circuitry for selecting the signal paths so as to select a delay amount; and an output to provide the delay adjusted signal to a load.

It is an object of another aspect of the present invention to provide a method of skew compensating an electronic module prior to its installation in a system, wherein the steps of the method are capable of automatic execution by suitable test equipment.

In order to achieve the foregoing object, a method is disclosed for adjusting signal delay on an electronic module having a clock input port, a test point, and a skew compensation circuit, including the steps of injecting a test signal into the clock port of the module; measuring signal delay between the clock port and the test point; comparing the measured signal delay to the desired signal delay; calculating the amount of adjustment needed to cause the measured signal delay to equal the desired signal delay; selecting a delay code that reflects the calculated amount of adjustment; and programming the skew compensation circuit according to the selected delay code.

It is an object of another aspect of the present invention to provide a pulse generator capable of generating pulses of a precisely determined width.

In order to achieve the foregoing object, an apparatus is disclosed, comprising an input to receive a clock signal; circuitry for generating a first edge of a pulse, being responsive to a first clock transition; circuitry for generating a second edge of a pulse, being responsive to a second clock transition; and delay elements including capacitive delay elements for delaying one of the clock transitions so as to define the width of the pulse.

It is an object of another aspect of the present invention to provide a system for clock distribution, wherein clock skew is minimized.

In order to achieve the foregoing object, a clock distribution system is disclosed, comprising a clock generator; a fanout circuit located at a distribution point for driving multiple loads; signal carriers for carrying signals from the fanout circuit to multiple destination points; and a skew compensation circuit located at a distribution point for skew compensating a clock signal prior to distribution.

While the most likely application for the present invention is in a computer system for distributing clock signals, those skilled in the art will recognize that the invention can be applied to a variety of systems and to any type of signal when it is necessary to precisely control its timing.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter in which there is illustrated and described a preferred embodiment of the invention.

BRIEF DESCRIPTION OF THE DRAWINGS

Referring now to the drawings in which like reference numbers represent corresponding parts throughout.

DETAILED DESCRIPTION OF THE PREFERRED EMBODIMENT(S)

Figure 1:
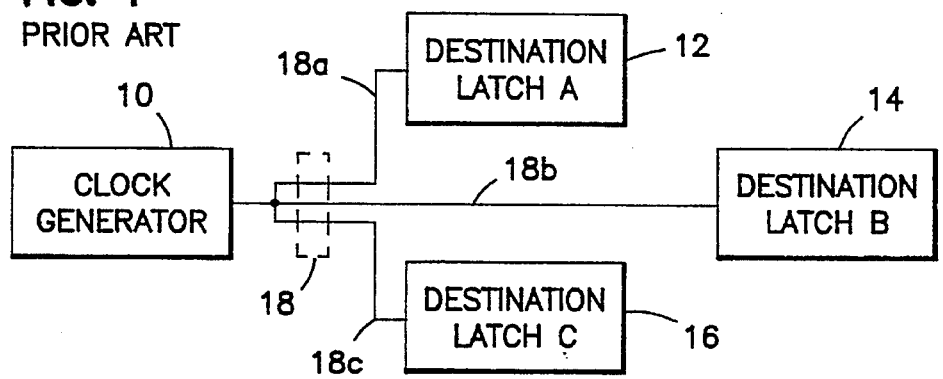
FIG. 1 is a block diagram showing clock destinations at various distances from the clock source.
Figure 2:
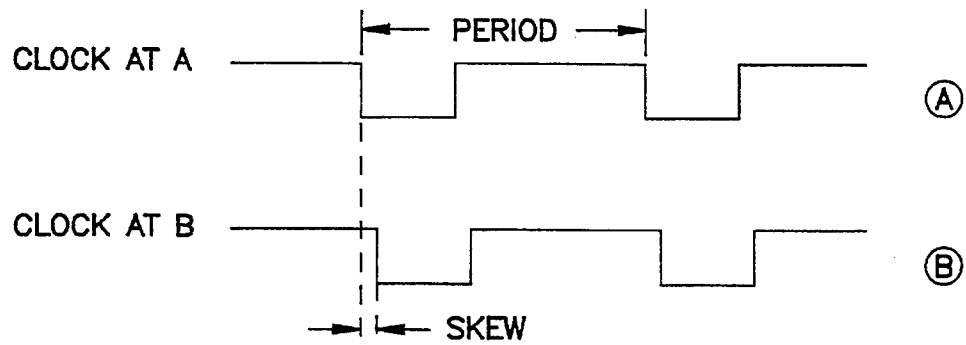
FIG. 2 is a timing diagram showing clock skew.

With reference to the drawings, and particularly to FIG. 1, a block diagram is shown including a clock generator 10 and three destination latches 12, 14 and 16. The connections 18 between the clock generator 10 and the latches 12, 14 and 16 are shown as being of different lengths. FIG. 2 is a timing diagram showing the relationship between the clock signals as they arrive at two of the destination latches. The clock signal itself is a periodic waveform having a period P. Trace A shows the waveform of the clock signal arriving at destination latch 12, and Trace B shows the waveform of same clock signal arriving at destination latch 14. In this example, the signals do not arrive at their destinations at exactly the same time due to the difference in length of connections 18a and 18b. This difference in time is the skew between the signals and is shown in FIG. 2 by S.

Figure 3:
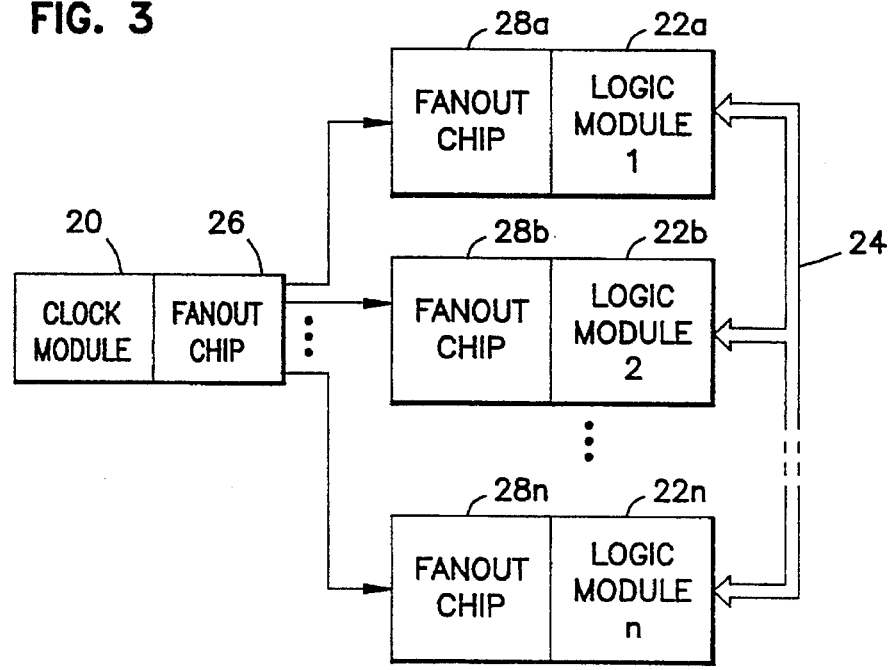
FIG. 3 shows a digital system including a clock module and multiple logic modules.

Referring to FIG. 3, a block diagram of a supercomputer or other digital logic machine according to one embodiment of the present invention is shown. The system is constructed in modules, with each module comprising a single circuit board or a stack of multiple circuit boards. A master clock module 20 generates clock signals which are then distributed to logic modules 22a–22n which are interconnected by data and control paths 24. In order to minimize skew, the system is designed to allow all clock signals on all modules to arrive at the latches they control at nearly the exact same time. This is accomplished by adjusting the delay experienced by each clock signal path. A system clock distribution circuit 26 provides for adjustment of each output of the clock module 20 so that the signals arrive at logic modules 22a–22n at the same time. In addition, each logic module 22a–22n contains a module clock distribution circuit 28a–28n, so as to adjust the skew of each clock signal within the logic module. In this way, every clock signal will arrive at the latch or latches it controls at nearly the same time.

Figure 4:
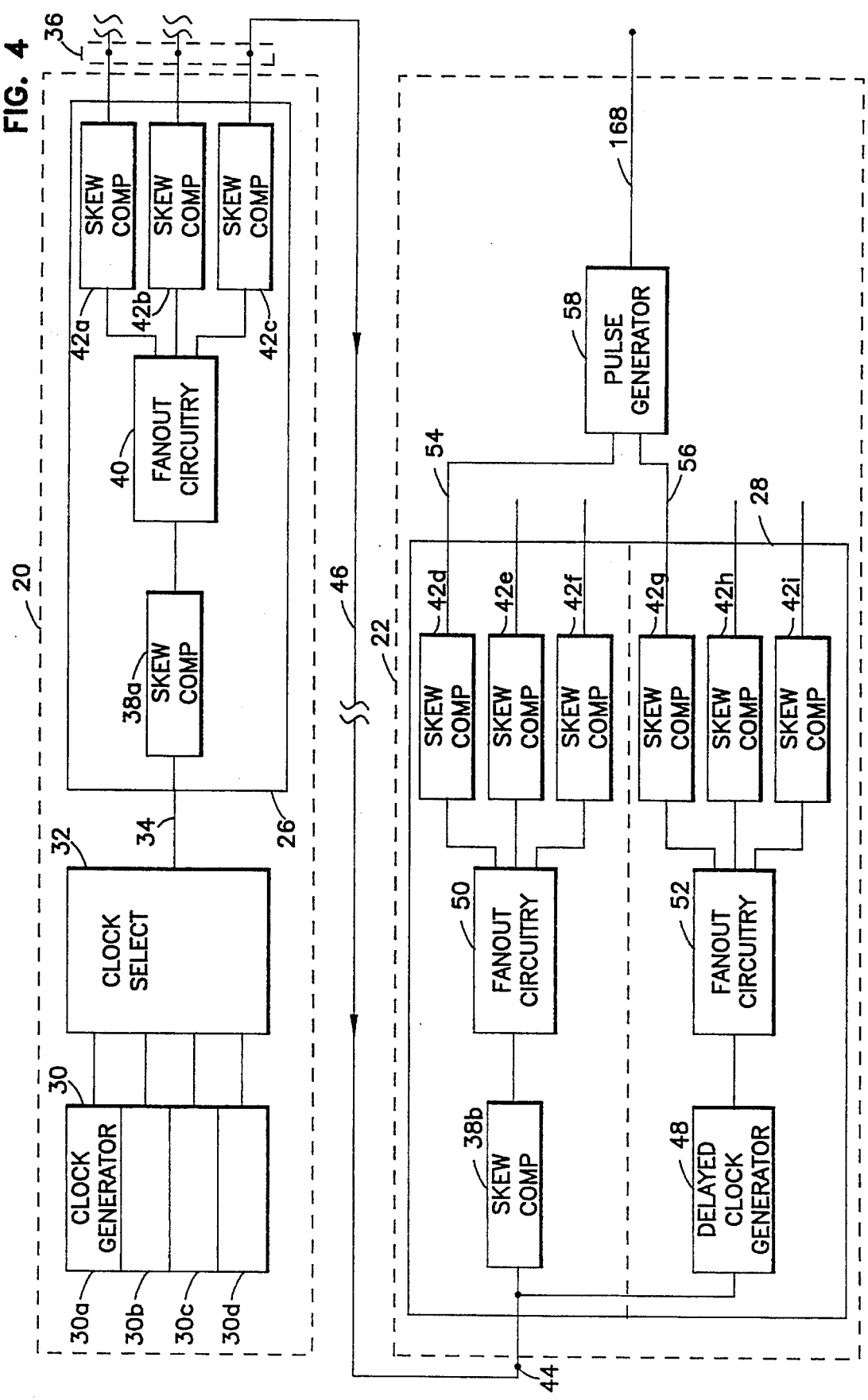
FIG. 4 shows a clock distribution system according to a preferred embodiment of the present invention, including clock generation and selection, skew compensation, fanout, distribution and pulse generation.

In FIG. 4, a portion of the clock distribution system according to one embodiment of the present invention is shown. A clock module 20 is shown connected to a single logic module 22. Within clock module 20, a clock source 30 includes multiple clock generators 30a–30d. These multiple clock generators would typically generate clock signals of different frequencies, such as for testing clock margins, or other diagnostic purposes. Clock select logic 32 determines which of the clock signals from clock generators 30a–30d will be distributed to the system, and operates in an appropriate manner as is known in the art. The selected clock signal 34 is passed through a system clock distribution circuit, which in this embodiment is a fanout chip 26, prior to reaching the distribution point 36. The fanout chip 26 includes skew compensation circuitry 38a for introducing an adjustable amount of delay into the signal path, fanout circuitry 40 for driving multiple loads, and skew compensation circuits 42a–42c for skew compensating each of the individual outputs of the fanout chip 26 to compensate for the different propagation delays between distribution point 36 and the various modules connected to these clock signals. Skew compensation circuits will be discussed in detail in reference to FIGS. 5–7. The skew adjusted clock signals emerging from the clock module 20 are connected between the distribution point 36 and multiple destination points located at many different physical locations within the supercomputer, only one of which is shown at 44. In each case, the signal is carried to the destination point 44 by a signal carrier 46 which is preferably a twisted pair, a coaxial cable, a fiber optic link, or by any other means which provides a controlled impedance and some protection against crosstalk between signals.

In this embodiment, only one level of fanout is shown. However, one skilled in the art will recognize that multiple levels of fanout may be required, depending upon how widely the signal is to be distributed. Thus, a first fanout circuit may drive multiple fanout circuits, each of which in turn drives multiple loads.

The signal carrier 46 is constructed to be of a known delay. By preferably making all signal carriers 46 of the same delay, the clock signal will arrive at all destination points at the same time, subject to minor variations in the signal carriers 46 and the fanout circuitry 40. These minor variations can be compensated for by adjusting of the skew compensation circuity 42a–42c. At the destination point 44 there is a logic module 22 which includes a module clock distribution circuit which is preferably implemented as a fanout chip. Fanout chip includes skew compensation circuitry 38b, a delayed clock generator 48, fanout circuits 50 and 52, and skew compensation circuits 42a–42i for skew compensating each of the individual outputs from the fanout chip 28. The delayed clock generator 48 preferably includes skew compensation circuitry for adjusting the amount of delay, and an additional delay element such as a delay buffer if the desired delay amount exceeds that which the skew compensation circuitry alone can provide. Fanout chip 28 thus provides a clock signal 54 and a delayed clock signal 56 to a pulse generator 58. Pulse generators will be discussed in detail in reference to FIGS. 8–10. In this embodiment, the width of the pulse generated by pulse generator 58 is determined by the amount of delay between the delayed clock signal 56 and the clock signal 54. Thus, the desired amount of delay to be introduced by the delayed clock generator 48 is determined by the desired width of the pulse.

Skew compensation circuit 38a is not essential since it does not aid in adjusting the skew between signals since all clocks signals in the embodiment of FIG. 3 are subject to the delay of skew compensation circuit 38a. However, it does not detract from the performance of the circuit, and allows the designer to use the same fanout chip design for fanout chips 26 and 28.

Those skilled in the art will recognize that through proper adjustment of the skew compensation circuits of FIGS. 3 and 4, all clock signals will arrive at all latches throughout the machine at nearly the same time such that any data signal traveling between any two latches in the machine will be clocked by nearly identically timed clocks. Adjustment of the skew compensation circuits will be discussed in reference to FIG. 12.

Every signal path in the clock distribution system of FIGS. 3 and 4 is preferably differential, and each signal line represents both halves of a differential signal. The use of differential-capable logic devices such as Emitter Couple Logic (ECL) is known in the art and will not be discussed in detail. An advantage to using differential signals rather than single ended signals is that differential signals are relatively unaffected by noise on a power supply or ground reference. For example, if the logic level of a signal is determined by its voltage relative to ground (single ended operation) and there is noise on a gate's ground reference, then the point in time when the logic level is determined to have switched will be affected by the noise and skew will thus be introduced. By using differential signals, the logic level of the signal does not depend upon a voltage relative to ground. The logic level is rather determined by the difference in voltage between the two halves of the differential signal. Thus, any noise on a logic gate's ground reference will not affect the determination of the logic level and will not introduce skew. Similarly, differential signals will be immune from common mode noise or any undesirable influence which affects both halves of the signal.

Figure 5:
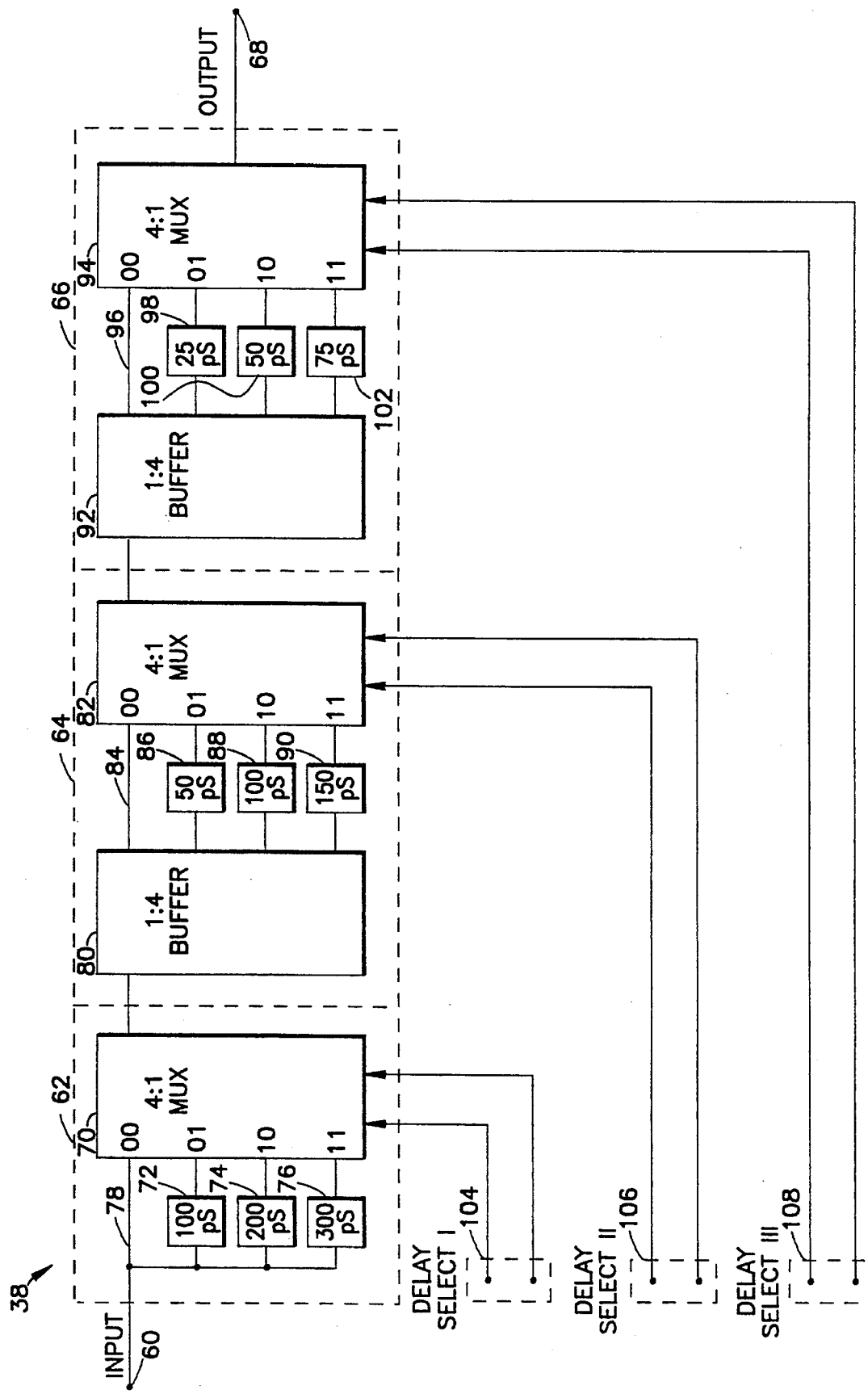
FIG. 5 is a block diagram of a multistage skew compensation circuit according to a preferred embodiment of the invention.

Referring now to FIG. 5, an improved skew compensation circuit 38 is shown according to a preferred embodiment of the present invention and which is preferably fabricated on an integrated circuit substrate using silicon, gallium arsenide (GaAs), or other suitable high speed solid-state technology. Skew compensation is accomplished by adjusting the amount of delay experienced by one clock signal in relation to another on a system-wide basis. The clock signal is passed from the input 60 and through three stages of signal delay, 62, 64 and 66, before reaching the output 68. The first delay stage 62 includes a four to one multiplexer 70, and three delay elements, 72, 74 and 76. The clock signal from the input 60 appears at all inputs of the multiplexer; directly with no delay 78, and through each of the three delay elements 72, 74 and 76. The numbers in the delay element boxes refer to the amount of delay associated with that element, in this embodiment, in units of picoseconds. The output from the multiplexer 70 is fed to buffer 80, which provides the signal to all four inputs of multiplexer 82; directly with no delay 84, and through each of the three delay elements 86, 88 and 90. The third delay stage 66 likewise is comprised of a buffer 92 which feeds a signal from the previous stage's multiplexer 82 to multiplexer 92; directly with no delay 96, and through each of three delay elements 98, 100 and 102.

Delay select lines 104 are connected to multiplexer 70, and control which of the four input lines will be passed on to the next delay stage 64. Likewise, delay select lines 106 control multiplexer 82, and delay select lines 108 control multiplexer 94. The delay select lines 104, 106 and 108 taken together embody a delay select code corresponding to the selected delay amount. Thus, a clock signal on the input 60 passes through the skew compensation circuitry 38 to the output 68 after delaying the cumulative amount specified by the three delay stages 62, 64 and 66. By altering the delay select lines 104, 106 and 108, the overall delay of the signal from input 60 to output 68 can be varied so as to adjust skew between this signal and an appropriate reference.

Each of buffers 80 and 92 are preferably designed as a single macro with identical outputs. This results in nearly identical drive capability and loading characteristics, causing only metal variations to affect the delay amount.

Every signal path which carries a clock signal is preferably a differential signal. Thus, the logic level of each signal is not determined in reference to a power signal supply voltage such as ground, which eliminates skew caused by noise on power supply signals. Delay select lines 104, 106 and 108 need not be implemented as differential signals since they are preferably latched logic levels and thus are not time critical.

The type of delay elements used will depend on several factors, including the magnitude of the delays desired and the amount of space in the chip that the designer can afford to devote to delay elements. For example, longer metal lengths will provide correspondingly more loading capacitance and hence longer signal delays. The actual length needed to implement a particular delay amount depends upon the fabrication process being used, but is known or easily discerned with minimal experimentation for any given fabrication process. It may not be feasible to implement all delay elements with metal lengths. The longer the desired delay, the more metal is needed. If more metal is used, more space is taken up in the integrated circuit package. So depending upon the amount of space available and the magnitude of the delays desired, it may be necessary to use delay buffers or other well known means for delaying signals for certain of the delay elements. In the embodiment illustrated in FIG. 4, delay elements 86, 88, 90, 98, 100 and 102 are rather small in magnitude, and thus are preferably implemented using a capacitive delay element. Capacitive delay elements can be accurately constructed to 10 picosecond resolution or better, and are thus well suited for small magnitude delays. Examples of capacitive delay elements include tuned metal lengths, diffusion capacitors, and capacitor macros.

Buffers 80 and 92 isolate the delay elements from each other. Without buffer 80, for example, the delay elements 86, 88 and 90, along with zero delay path 84, would all be connected directly to the output of the multiplexer 70 from the previous stage. Since the delay elements are capacitive, connecting them together at a common point would result in the several delay elements appearing as a single lumped capacitance to the multiplexer 70. As a result, all four inputs to multiplexer 82 would show the same signal delay.

Delay elements 72, 74 and 76 are preferably implemented using delay buffers in this embodiment due to the fairly large delay amounts. While a capacitive delay element such as a tuned metal length or a diffusion capacitor could be used instead of delay buffers, the amount of space taken up by these capacitive delay elements may be prohibitive, and thus the larger delay elements more effectively implemented with delay buffers. Note that in the first delay stage 62, the inputs to delay elements 72, 74 and 76, as well as the zero delay path 78, are directly connected to the input 60. No separate buffering is needed as in the other two delay stages since the delay elements here are not capacitive and will thus not be seen as a lumped capacitance when connected together at a common input point.

Capacitive delay elements such as tuned metal lengths or diffusion capacitors are dependent upon the IC process being used, and thus the delay values cannot be easily predicted. However, reasonable estimates can be made through the use of a simulated or an actual test die. If adequate simulation data is available, reasonable predictions are possible. It is also possible to construct an actual IC which contains capacitive delay elements of various values. These delay values can then be measured to determine the delay that results from a given geometry of a capacitive element. In addition, if the capacitive elements are tuned metal lengths, these lengths may need to be routed on the IC by hand. An automatic routing tool would attempt to connect two points via a straight line, but many delay elements would require a longer metal trace than an autorouter would provide. Thus it may be necessary to route by hand a serpentine trace or some pattern other than a straight line.

Those skilled in the art will recognize that several variations are possible without departing from the scope of the present invention. For example, a different number of delay stages may be used. Additionally, the number of delay elements per stage, the delay values, and the types of delay elements may be varied without departing from the spirit or scope of the invention.

Since no signal path can have exactly zero delay, there is some minute delay associated with the zero delay paths 78, 84 and 96. This delay is likely to be small, and thus not substantially contribute to skew. In addition, any delay contributed by the zero delay path can be compensated for by the addition of delay to the other paths. This is true because skew is measured as a timing difference between two signals, and any delay affecting both signals equally does not contribute to skew between them. So even if the zero delay paths 78, 84 and 96 have associated with them a non-trivial delay 'X', then each of the delay elements could be designed to include the desired delay plus 'X'. In this way, the signal passing through the skew compensation circuitry will experience the selected delay plus three 'X' delays, regardless of the delay selected. This will be true of all clock signals since each will be subject to the same number of skew compensation circuits, thus the delay 'X' will not introduce skew between clock signals.

There is also delay associated with the multiplexers 78, 84 and 96 and buffers 80 and 92. A system using the skew compensation circuit of FIG. 5 is preferably designed in a manner similar to that shown in FIGS. 3 or 4, where every clock signal path is subjected to the same number of skew compensation circuits. Thus all clock signal paths contain the same number of multiplexers and buffers, and so the presence Of multiplexers and buffers does not introduce skew. Any variation in the delay between multiplexers or buffers in different signal paths could introduce skew, but is taken care of by adjustment of the skew compensation circuits, as would be gate delay variations found elsewhere in the signal paths.

The entire skew compensation circuit of FIG. 5 can be contained within a single IC package, or can be defined as a macro for inclusion in a Large Scale Integrated (LSI) circuit design such as fanout chips 26 and 28 in FIG. 4 or in an application specific integrated circuit (ASIC).

Referring again to FIG. 5, one advantage of this embodiment of the present invention is apparent in that there are multiple delay selection codes for most of the desired delay amounts. For example, there are four signal paths through the skew compensation circuitry having a delay value equal to 150. One path is through elements 78, 88 and 100. Another is through elements 78, 90, and 96. The third is through elements 72, 84, and 100. The fourth is through elements 72, 86, and 96. The advantage to these seemingly redundant delay selection codes is that each of these paths may vary slightly in the actual amount of delay produced. Process variations and physical layout variances can cause one or more delay elements to have slightly more or less delay than anticipated. The presence of multiple delay selection codes allows a skew compensation circuit to be used even if a delay element deviates substantially from the expected value. Thus it is preferable to try all corresponding delay codes, once the desired amount of delay has been determined, and to select the one which is the most accurate.

Figure 6:
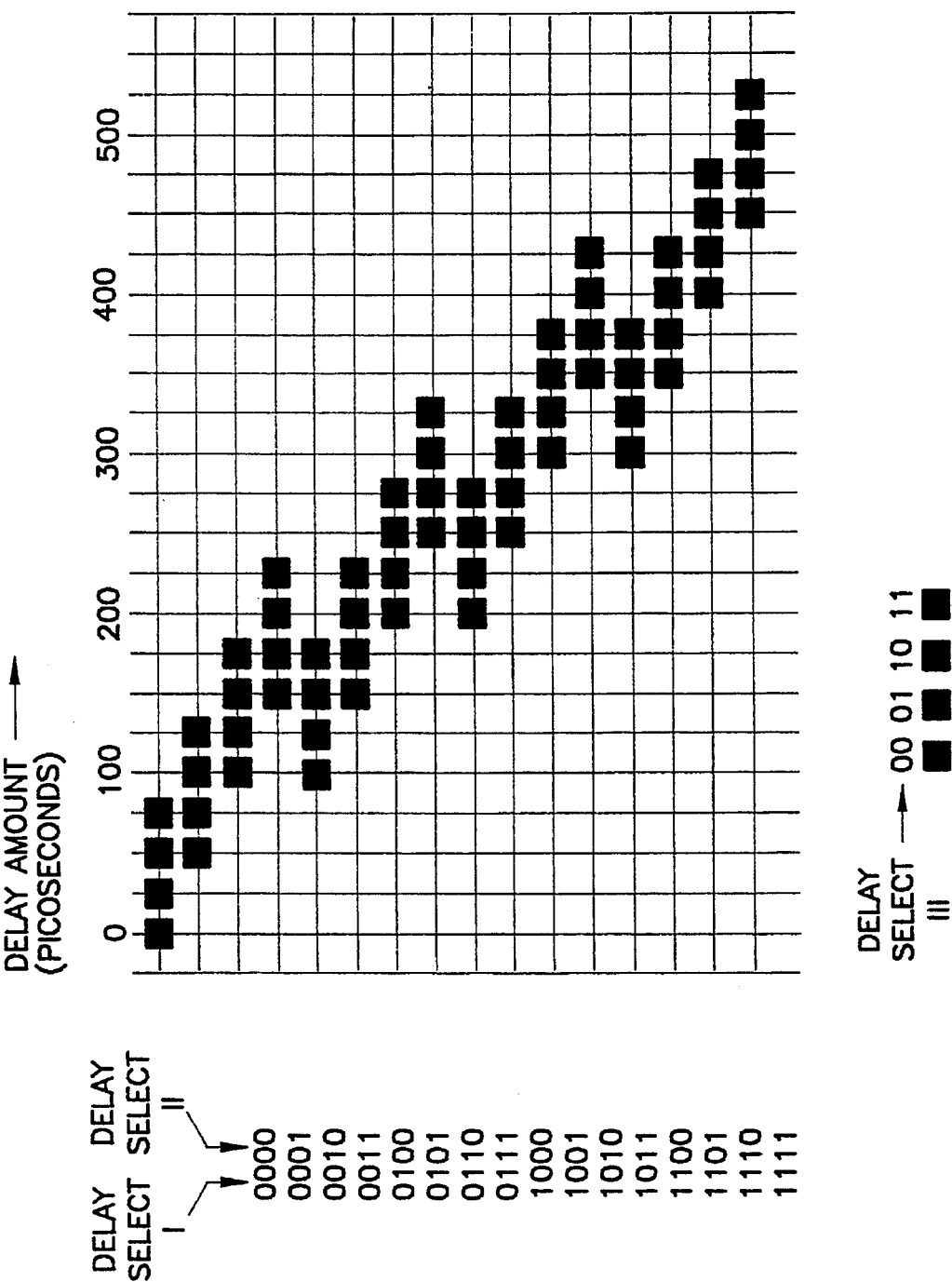
FIG. 6 is a table showing delay selection codes and the corresponding delay amount.

Referring to FIG. 6, a table shows the delay selection codes and the sixty-four corresponding delay amounts for the skew compensation circuit shown in FIG. 5. The total amount of delay is indicated in picoseconds across the top of the table. Delay Select I and Delay Select II are indicated along the left edge of the table. Delay Select III determines which of the four indicators in each horizontal row is selected, as is indicated at the bottom of the table. It can be seen from this table that coverage of various delay amounts occurs on 25 picosecond increments, and that most delay amounts can be obtained with multiple delay select codes.

Figure 7:
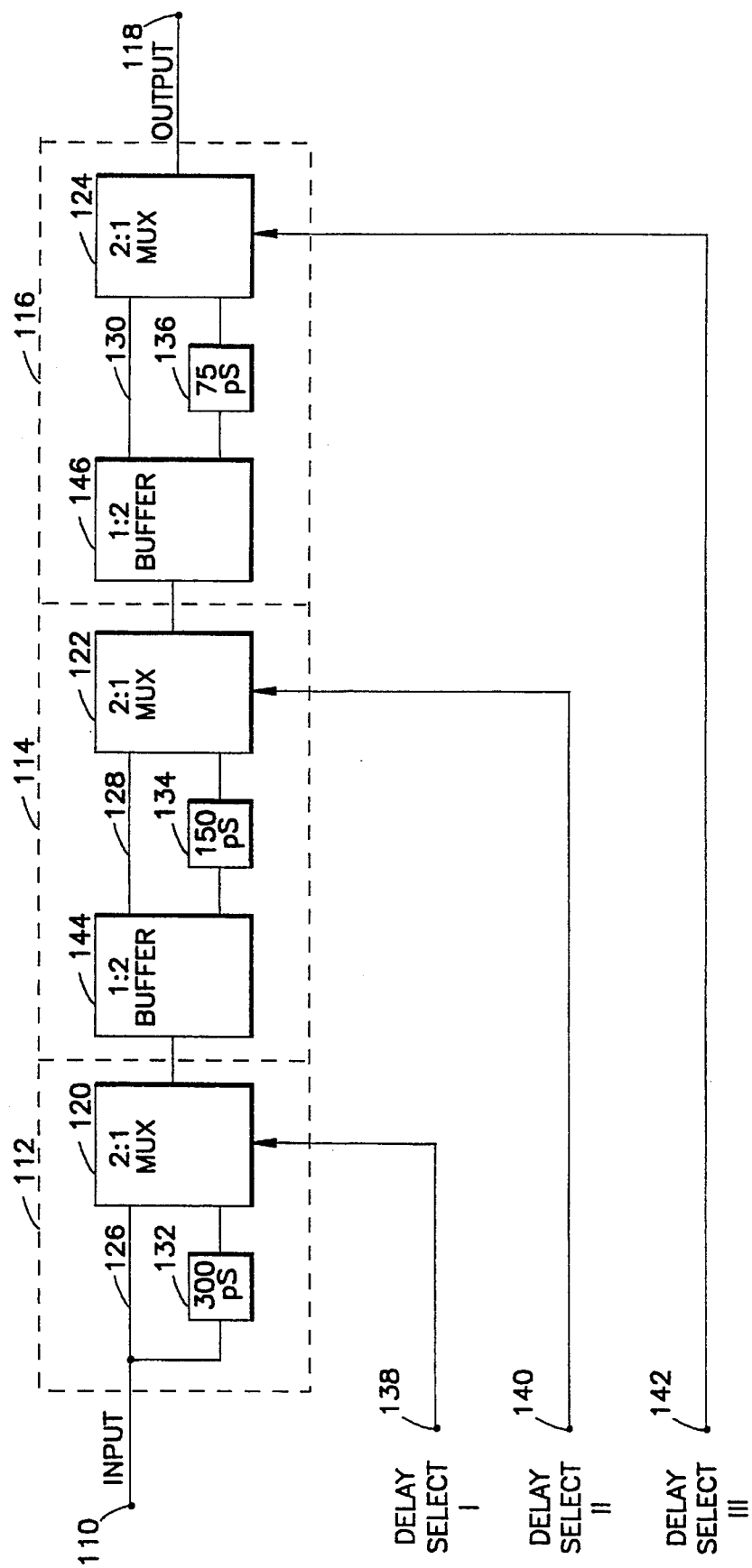
FIG. 7 is a block diagram of a multistage skew compensation circuit according to another embodiment of the present invention.

Referring to FIG. 7, an alternate embodiment of a skew compensation circuit is shown. A signal presented on the input 110 is passed through three stages of delay 112, 114 and 116 before reaching the output 118. Each delay stage includes a two input multiplexer 120, 122, 124. Each multiplexer selects between a zero delay path 126, 128, 130, and a path containing a delay element 132, 134, 136. Delay select lines 138, 140 and 142 control the path through which the signal will travel from the input 110 to the output 118 in the same way as in the embodiment shown in FIG. 5. Whether a delay element should be implemented as a delay buffer or as a capacitive delay element depends upon the same factors discussed in relation to the delay elements of FIG. 5. As shown in the embodiment of FIG. 7, delay element 132 is a delay buffer, and delay elements 134 and 136 are implemented as capacitive delay elements. Buffer 144 isolates the zero delay path 128 and the capacitive delay element 134, and buffer 146 isolates zero delay path 130 and capacitive delay element 136, thus preventing the capacitive delay elements 134 and 136 from influencing a delay upon the zero delay paths 128 and 130. By implementing delay element 132 as a delay buffer, no separate isolation buffer is needed to isolate delay element 132 from zero delay path 126.

As was the case for the embodiment of FIG. 5, so are the clock signals of FIG. 7 preferably implemented as differential signals. This eliminates reference to ground or another power supply voltage as a factor in determining logic level, and thus eliminates skew which results from noise on such power supply signals. The delay select lines 138, 140 and 142 need not be implemented as differential signals since they are preferably latched logic levels and thus are not time critical.

Those skilled in the art will readily recognize that a wide number of selectable delay elements can be included in the embodiments of FIGS. 5 and 7 to implement alternate types of skew compensation circuits within the scope of the present invention.

Figure 8:
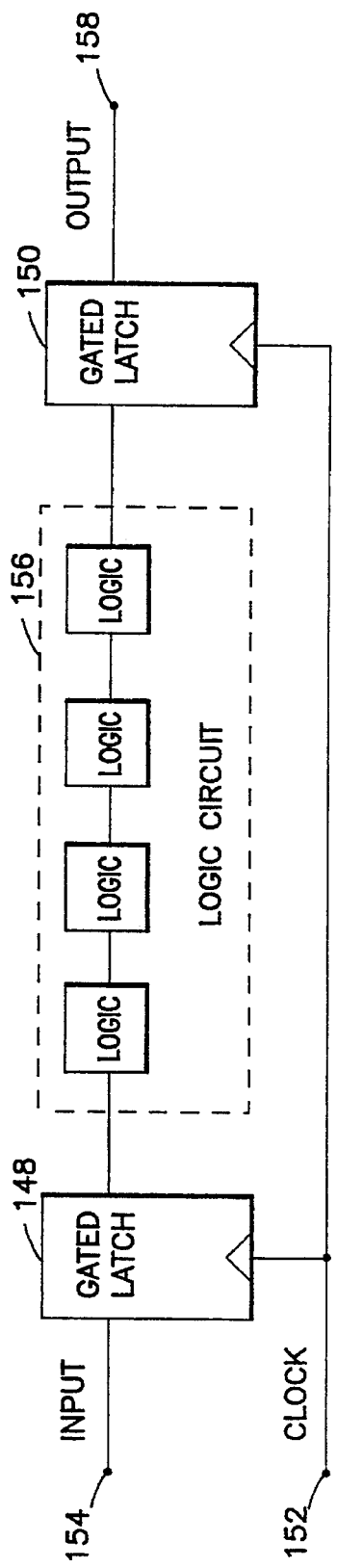
FIG. 8 shows a portion of supercomputer architecture, including transparent latches and intervening logic.

Referring to FIG. 8, a small portion of supercomputer architecture is shown. The circuit consists of two transparent or gated latches 148 and 150, which are both controlled by clock signal 152. (Transparent latches are "open" when the clock signal is active and are "closed" when the clock signal is inactive. When open, data presented to the input of the latch immediately appears on the output. When the latch closes, the data at the input is latched and remains at the output until the latch opens again.) Input data 154 is passed through latch 148 to logic circuit 156 when latch 148 is open as determined by the state of clock line 152. The design of the supercomputer is such that the data will propagate through logic 156 and reach the second transparent latch 150, and be passed through to the output 158 on a subsequent cycle of clock signal 152.

The most obvious choice for a clock signal is one with a

50% duty cycle. However, if a 50% duty cycle clock is used to control transparent latches, then the system is susceptible to what is commonly known as the min-path problem. If the path through logic 156 is shorter in propagation time than the minimum path (i.e., min-path) required by the design, the signals will propagate further through the computer than anticipated, resulting in errors. For example, with a 50% duty cycle clock, each transparent latch will be opened (allowing input data to pass from its input to its output) for 50% of the clock cycle. If the propagation delay through the logic 156 between the latches is too small, data from the previous latch 148 will propagate to the input of the next latch 150 before the second latch 150 has closed due to the fact that the latches have remained open for half the clock period. Thus, the minimum path needed for logic 156 is approximately one half of the clock period.

One way to reduce the minimum path requirement is to control the latches not with a 50% duty cycle clock, but with a pulse train of the same frequency but where the duration of each pulse is substantially less than 50% of the clock period. In this way, the transparent latches 148 and 150 will be open for a correspondingly reduced length of time, thus reducing the minimum path requirement. Furthermore, if the pulse width can be adjustably controlled, then the minimum path requirement can be reduced to nearly zero by providing a pulse width no wider than is necessary to reliably control the latches 148 and 150. In the embodiment of a clock distribution system shown in FIG. 4, a clock signal 54 and a delayed clock signal 56 are used by pulse generator 58 to generate a pulse train which is used to control the transparent latches.

Figure 9:
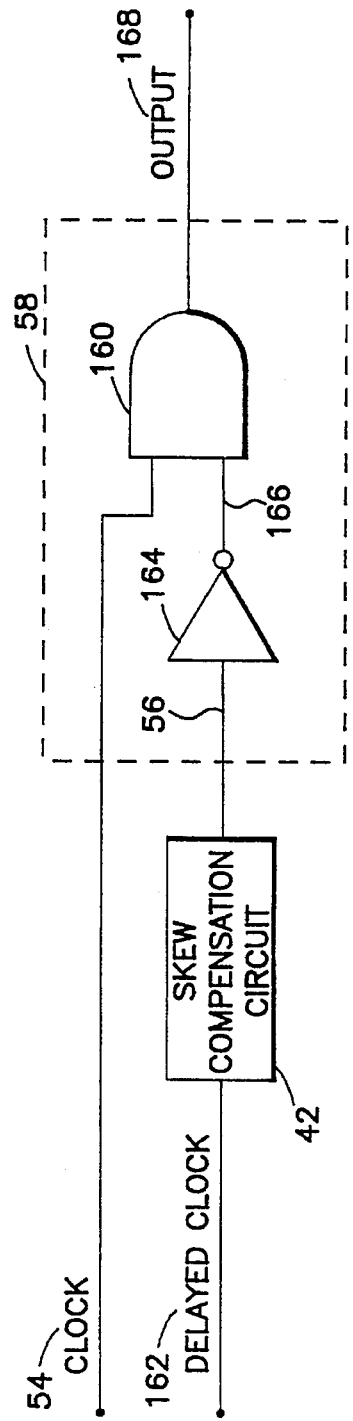
FIG. 9 shows a pulse generator according to a preferred embodiment of the present invention.

Referring to FIG. 9, a pulse generator 58 according to one embodiment of the present invention is shown. A clock signal 54 is connected to one input of a two input AND gate 160. A delayed version of the clock signal 162 is connected to a skew compensation circuit 42 so as to provide a delay adjusted delayed clock signal 56. The signal then passes through inverter 164 to create an inverted delayed clock signal 166, which is connected to the second input of the two input AND gate 160. The output 168 is high when both the clock 54 and the inverted delayed clock 166 are high. Skew compensation circuit 42 is preferably according to the embodiments of FIG. 5 or FIG. 7.

Figure 10:
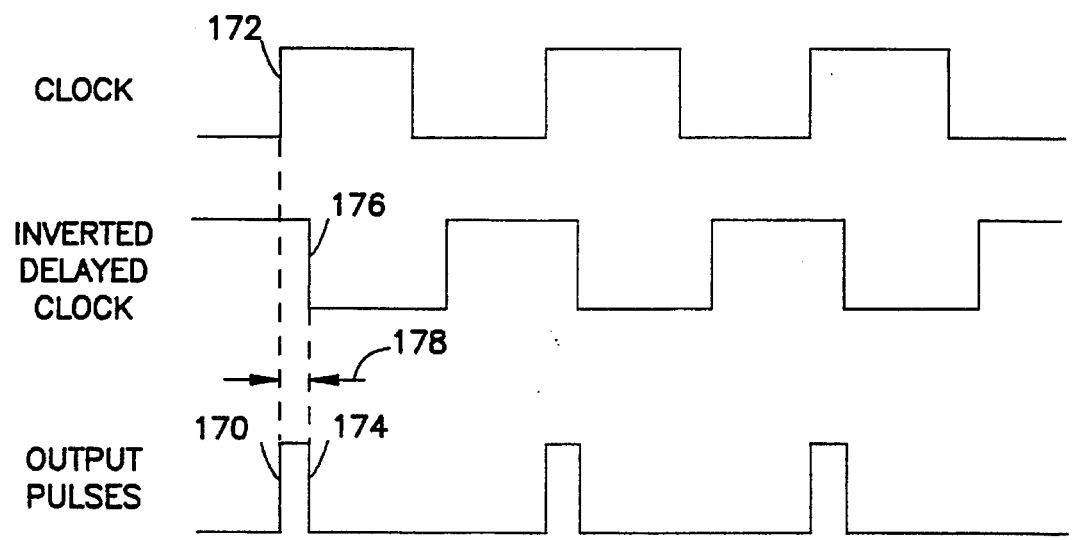
FIG. 10 is a timing diagram showing pulse generation using a clock and a delayed clock signal.

FIG. 10 shows a timing diagram of the operation of a pulse generator according to the embodiment of FIG. 9. As is shown, the leading edge of the output pulse 170 is defined by a rising edge of the input clock signal 172. The trailing edge of the output pulse 174 is defined by a falling edge of the inverted delayed clock signal 176. Thus the width 178 of the output pulse is determined by the amount of delay between the clock edge 172 and the inverted delayed clock edge 176. Since the skew compensation circuit 42 can adjust the amount of this delay, the output pulse width 178 can likewise be adjusted.

The signals of the pulse generator of FIG. 9 are preferably implemented as differential signals, so as to eliminate reference to a power supply voltage and skew which results from noise on power supply voltages. The output of AND gate 160 may or may not be a differential signal, depending upon the type of latch intended to be clocked by the output signal 168 and whether it requires a differential or single-ended clock.

Figure 11:
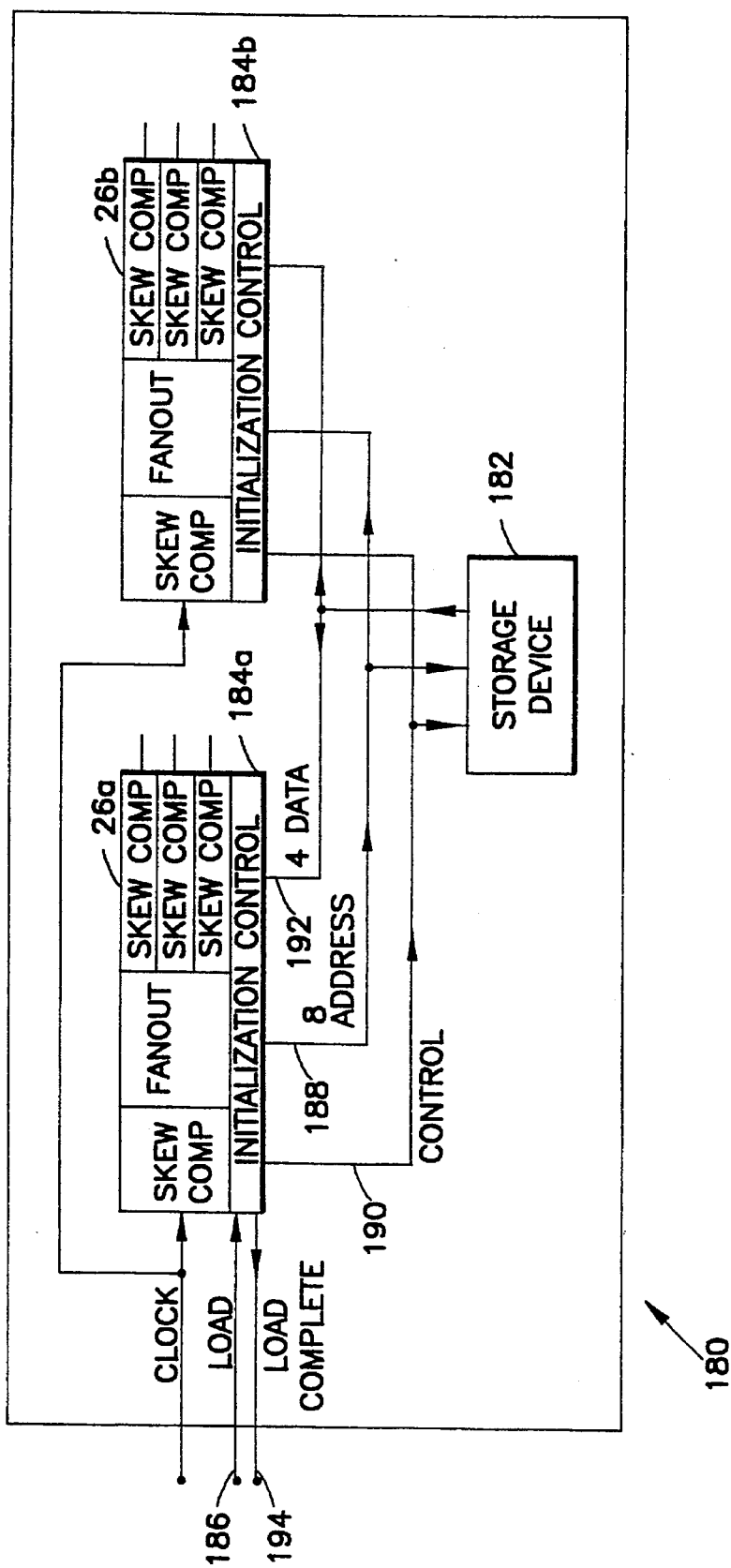
FIG. 11 is a block diagram showing two fanout chips, each of which includes skew compensation circuitry (not shown) and initialization control, and which share a storage device within which the delay selection codes for the skew compensation circuits of both fanout chips are stored.

Referring to FIG. 11, a supercomputer module 180 is shown, including fanout chips 26a and 26b and a storage device 182, whereby delay selection codes can be stored on the module and the skew compensation circuits within fanout chips 26a and 26b can be automatically initialized with these stored codes upon power-up of the supercomputer. According to a preferred embodiment of the present invention, a master fanout chip 26a and a slave fanout chip 26b share the storage device 182 within which the delay selection codes are stored. The storage device 182 is preferably a non-volatile memory device such as a Programmable Read Only Memory (PROM), so as to maintain storage of delay selection codes even when power is removed from the circuit. A storage device and the fanout chips for which it stores delay selection codes are preferably located on the same circuit board or module. In that way, the delay selection codes always remain with the correct fanout chips, even if the circuit board or module is moved from one machine to another.

In the embodiment of FIG. 11, fanout chips 26a and 26b are identical, with fanout chip 26a operating in a master mode and fanout chip 26b operating in a slave mode. Each fanout chip includes initialization control 184a and 184b for controlling the initialization of fanout chips 26a and 26b with data from the storage device 182. The master fanout chip 26a controls the initialization process in response to a load signal 186. It provides address lines 188 and control lines 190 for sequentially accessing data stored in the storage device 182 by stepping through the addresses of the storage device 182 in a manner known in the art. Data lines 192 are outputs from the storage device 182 to both fanout chips 26a and 26b. A load complete signal 194 indicates that the delay selection codes have been loaded, and that the circuit is ready for operation.

Alternately, the storage device 182 may be located elsewhere in the system (i.e., not on module 180), and may be a floppy disk, tape cartridge, or other means of storing information.

Those skilled in the art will recognize that the number of data bits, number of address bits, the number of fanout chips sharing the storage device, and other aspects of this embodiment of the present invention can be altered without departing from the scope of the invention.

Figure 12:
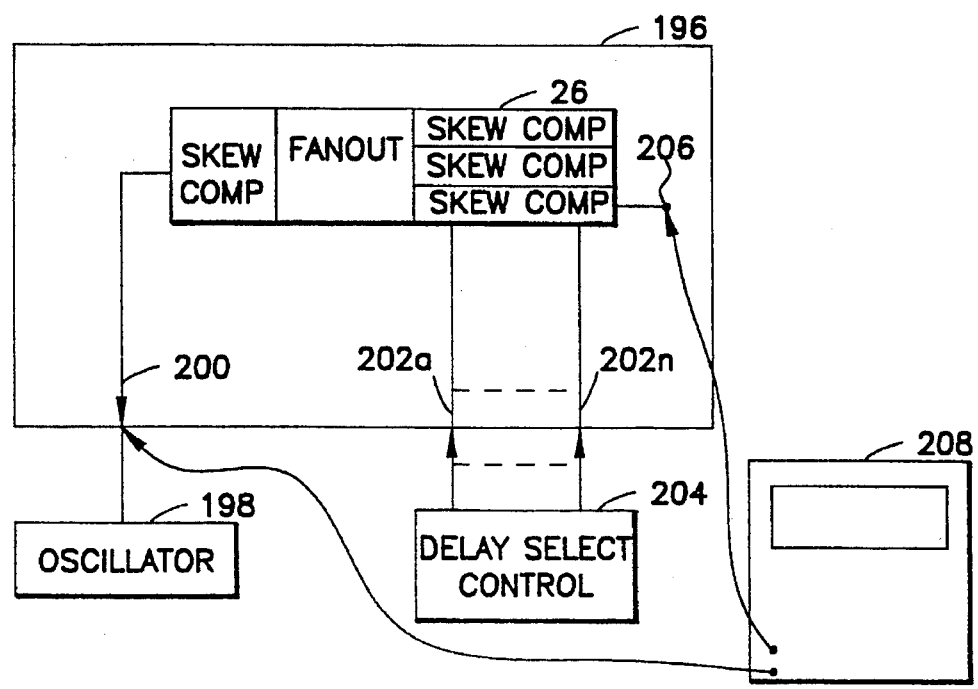
FIG. 12 shows the test set up for adjusting the skew compensation circuit within a fanout chip located on an electronic module, including test equipment and measurement probes.

Referring to FIG. 12, a test setup is shown where a module 196 contains a fanout chip 26 which can be adjusted to skew compensate signals. A signal from an oscillator 198 is injected into the clock input port 200 of the module 196. Delay select lines 202a–202n are initially set to some nominal value by an external delay control 204. The actual number of delay select lines depends upon the specifics of the skew compensation circuit within fanout chip 26, as was discussed relative to FIGS. 5–7. Measurement probes having fixed identical delay lengths are attached to the clock input port 200 and a test point 206, which is connected to an output of fanout chip 26. The signal delay between these two points is measured by an oscilloscope 208, or other device capable of measuring signal delay. This measured delay is compared to the amount of delay desired according to the design of the module 196 and the system within which the module will reside (not shown). The difference between these two values determines the change to the delay select lines 202a–202n needed for the measured delay to equal the desired delay. Delay select control 204 is changed to reflect the newly calculated values, and the measurement is repeated to verify accuracy. If the skew compensation circuit within fanout chip 26 provides redundant delay selection codes for the current delay amount, each of these redundant codes can be tried and measured to determine which is the most accurate. By adjusting modules in this manner, clock skew due to variations in delay between clock port 200 and the outputs of fanout chip 26 resulting from variations in intervening circuitry can be eliminated.

The desired value against which the signals to be adjusted are compared, is determined by an analysis of the entire system. In order to equalize electrical lengths of signal paths by inserting delay, the desired delay value must be greater than or equal to the delay of the longest path on any module determined before delay is added. Once this maximum delay path is determined, delays can be added to the rest of the paths in appropriate amounts. The desired delay value is preferably the expected delay of the longest path plus an additional amount to provide some margin in case certain modules have a delay path longer than the expected longest delay.

In a similar manner, the entire clock distribution system of FIG. 4 can be adjusted to compensate for skew in the signals. Fanout chip 28 is contained on a module, and the skew compensation circuits within it are adjusted according to the previous discussion. The skew compensation circuits 38a, 42a–42c within fanout chip 26 on clock module 20 are adjusted by attaching measurement probes to the input signal 34, and to the signal which reaches the destination point 44. The procedure then continues along the same lines as for adjusting the fanout chip on a module, adjusting the delay until it matches the desired delay. The signal delay between the signal at 34 and the signal at 44 are compared to a desired amount, and the delay selection codes adjusted to compensate. As before, redundant delay selection codes can be tried to determine which is the most accurate.

The individual modules are preferably adjusted prior to being installed in the computer, although adjustment may occur after installation if appropriate test points are accessible. Adjustment of the remaining portion of the clock distribution system may proceed without the modules installed if adequate test points can be provided. If not, then test points should be provided on the modules themselves, and adjustment of the clock distribution system would then proceed with all the modules installed.

It is to be understood that even though numerous characteristics and advantages of various embodiments of the present invention have been set forth in the foregoing description, this disclosure is illustrative only and changes may be made in detail to the full extent indicated by the broad general meaning of the terms in which the appended claims are expressed.

What is claimed is:

1. A method of adjusting signal delay on an electronic module for a system, wherein the electronic module is comprised of a clock input port, a test point, a skew compensator located electrically between the clock input port and the test point, and a storage device for storing delay codes, wherein a desired delay is selected so that the desired delay is equal to or greater than a longest delay path expected on any module in the system, the method comprising the steps of:

(a) injecting a test signal into the clock input port of the module;

(b) measuring a delay for the test signal between the clock input port and the test point;

(c) comparing the measured delay to the desired delay;

(d) calculating an amount of adjustment needed to cause the measured delay to equal the desired delay;

(e) selecting a delay code that reflects the calculated amount of adjustment; and (f) programming the skew compensator according to the selected delay code.

2. A method according to claim 1, further comprising the step of programming the storage device with the selected delay code.

3. A method according to claim 1, wherein steps (a) through (f) are repeated, so as to verify the accuracy of the selected delay code.

4. A method according to claim 3, further comprising the steps of:

(g) programming the skew compensator with a new delay code that causes the same delay in the skew compensator as the selected delay code;

(h) selecting between the new and selected delay codes the code that most nearly causes the measured delay to equal the desired delay; and (i) repeating steps (g) and (h) for all delay codes that cause the same delay in the skew compensator as the selected delay code.

\* \* \* \* \*